H. CHATFIELD.
Garden Rake.
No. 12,750.  Patented Apr. 17, 1855.
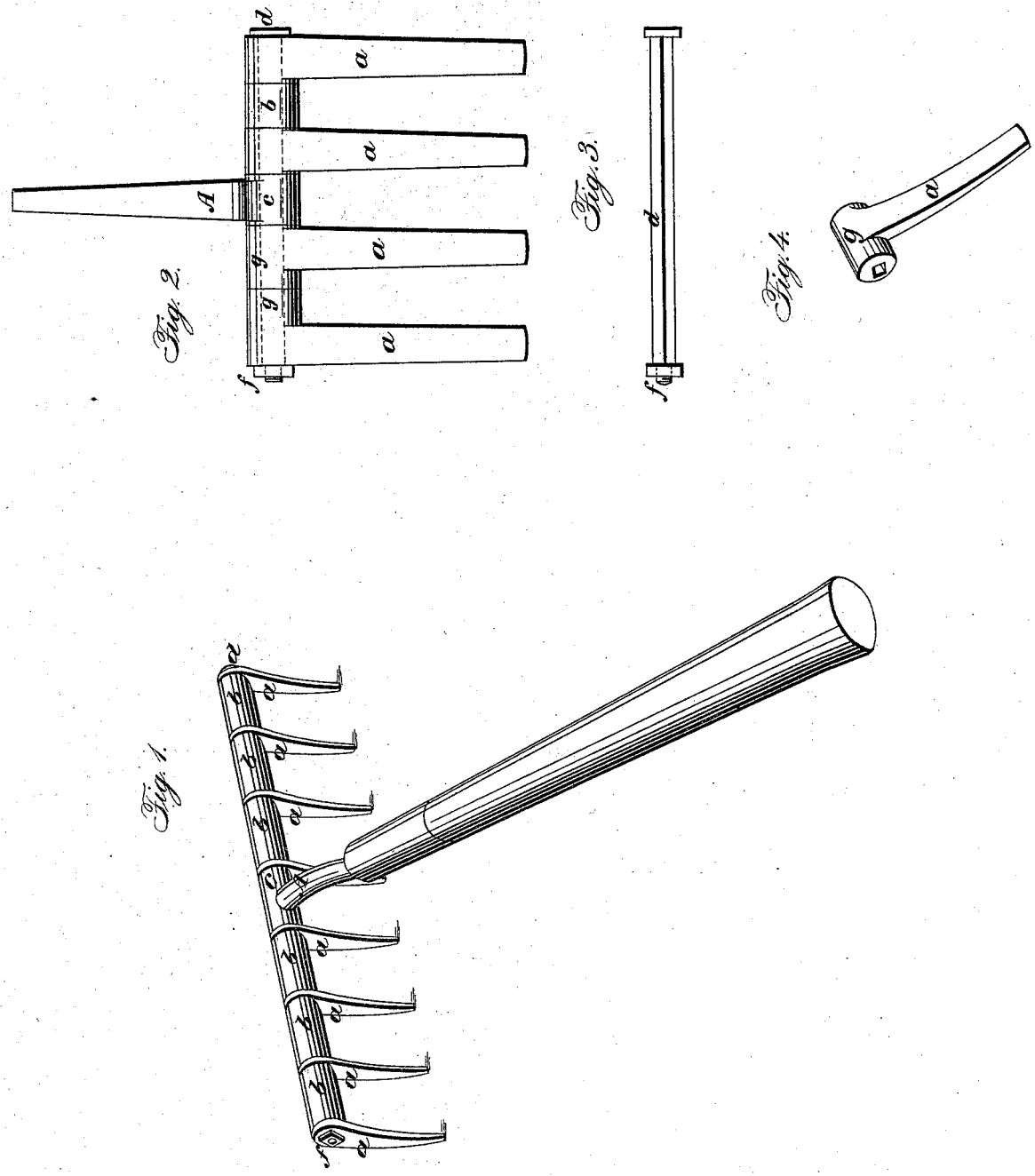

UNITED STATES PATENT OFFICE.

HENRY CHATFIELD, ASSIGNOR TO HENRY CHATFIELD AND P. L. SNYDER, OF WATERBURY, CONNECTICUT.

IMPROVEMENT IN RAKES.

Specification forming part of Letters Patent No. 12,750, dated April 17, 1855.

*To all whom it may concern:*

Be it known that I, HENRY CHATFIELD, of Waterbury, in the county of New Haven and State of Connecticut, have invented a new and Improved Mode of Constructing Rakes and Forks; and I do hereby declare that the following is a full and exact description thereof, reference being had to the accompanying drawings, making a part of this specification—

Figure 1 being a perspective view of a garden-rake constructed in my improved manner; Fig. 2, view of a fork constructed in a similar manner; Fig. 3, view of the bolt which unites the teeth or tines; Fig. 4, view of one of the tines of the fork detached.

Like letters designate corresponding parts in the several figures.

The nature of my invention consists in constructing the teeth or tines separately with square or an equivalent form of apertures through the heads, and uniting them by a single bolt accurately fitting and passing through all the said apertures and through a similar aperture in the shank of the instrument, the teeth or tines being kept at suitable distances apart by washers or blocks placed upon the bolt between them, or by enlarging the heads thereof for the same purpose, the whole being secured firmly together by a nut screwed upon the end of the bolt, or in any other convenient manner.

The teeth or tines $a\ a$ are made separately, of the desired shape, and a square aperture or eye of equal size is formed in the head of each, as seen in Fig. 4. The shank A is also provided with a head, $c$, the aperture through which is of the same size and shape as those of the teeth or tines. A bolt, $d$, of corresponding size and shape and of the proper length, is then passed through the apertures of all the teeth or tines which are to compose a single rake or fork, and through said aperture of the shank. The bolt is provided with a head at one end, and at the other end with a screw-thread and nut, $f$, which secure all the parts firmly together. In order that the teeth or tines may be kept at the proper distances apart, blocks or washers $b\ b$ are placed upon the bolt between them, as shown in the drawings, being perforated for the reception of the bolt; or the heads of the tines may be enlarged, as seen at $g\ g$, Figs. 2 and 4, sufficiently to accomplish the same purpose. The apertures of the teeth or tines and shank may be of angular forms other than square, or of almost any shape which will not allow the teeth or tines and shank to turn on the bolt.

This manner of construction, besides its simplicity and cheapness, enables one to replace a broken tooth or tine, and to increase or lessen the number at pleasure.

What I claim as my invention, and desire to secure by Letters Patent, is—

Constructing the teeth or tines of a rake or fork separately, with square or an equivalent form of apertures through the heads thereof, and uniting them by a single bolt accurately fitting and passing through all the said apertures and through a similar aperture in the shank of the instrument, the teeth or tines being kept at suitable distances apart by washers or blocks placed upon the bolt between them, or by enlarging the head thereof for the same purpose, the whole being secured firmly together by a nut screwed upon the end of the bolt, or in any other suitable manner.

HENRY CHATFIELD.

Witnesses:
EDWARD J. PORTER,
JOHN W. WEBSTER.